United States Patent
Franke et al.

(10) Patent No.: US 11,579,727 B2
(45) Date of Patent: *Feb. 14, 2023

(54) INPUT DEVICE AND METHOD OF DETECTING AN INPUT

(71) Applicant: e.solutions GmbH, Ingolstadt (DE)

(72) Inventors: Thomas Franke, Laupheim (DE); Thomas Fuessinger, Neu-Ulm (DE); Michael Beck, Munderkingen (DE)

(73) Assignee: E.SOLUTIONS GMBH, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,167

(22) Filed: Jul. 1, 2021

(65) Prior Publication Data

US 2021/0325995 A1 Oct. 21, 2021

Related U.S. Application Data

(63) Continuation of application No. 16/719,188, filed on Dec. 18, 2019, now Pat. No. 11,073,943, which is a (Continued)

(30) Foreign Application Priority Data

Jan. 19, 2017 (DE) ...................... 10 2017 000 441.2

(51) Int. Cl.
*G06F 3/041* (2006.01)
*G01L 1/26* (2006.01)
(Continued)

(52) U.S. Cl.
CPC .............. *G06F 3/0418* (2013.01); *G01L 1/26* (2013.01); *G06F 3/04166* (2019.05);
(Continued)

(58) Field of Classification Search
CPC ......... G06F 3/0418; G06F 2203/04105; G06F 2203/04108; G01L 1/26; B60K 35/00;
(Continued)

(56) References Cited

U.S. PATENT DOCUMENTS

| 11,073,943 | B2* | 7/2021 | Franke ................ G06F 3/04166 |
| 2006/0279548 | A1 | 12/2006 | Geaghan |
| 2007/0057928 | A1 | 3/2007 | Prados |
| 2009/0243817 | A1 | 10/2009 | Son |

(Continued)

FOREIGN PATENT DOCUMENTS

| CN | 102407815 A | 4/2012 |
| CN | 105045430 A | 11/2015 |

(Continued)

OTHER PUBLICATIONS

Applicant: e.solutions GmbH; Chinese Patent Application No. 201810055182.0; "Input Device and Method of Detecting an Input"; Chinese Office Action dated Aug. 5, 2020; 12 pgs.

(Continued)

*Primary Examiner* — Stephen G Sherman
(74) *Attorney, Agent, or Firm* — Tarolli, Sundheim, Covell & Tummino LLP

(57) ABSTRACT

An input device is described which comprises a touch-sensitive surface and a force sensor, wherein the force sensor is adapted to detect a force applied to the touch-sensitive surface. The input device further comprises a vibration sensor and a control unit, wherein the control unit is coupled with the force sensor, the touch-sensitive surface and the vibration sensor. The control unit is adapted to validate a force detected by the force sensor as an input in dependence on a touch of the touch-sensitive surface and in dependence on a vibration detected by the vibration sensor. There is further described a motor vehicle which comprises such an (Continued)

input device. A method of detecting an input at an input device is further described.

15 Claims, 11 Drawing Sheets

Related U.S. Application Data continuation of application No. 15/873,054, filed on Jan. 17, 2018, now Pat. No. 10,545,613.

(51) Int. Cl.
*G01H 1/00* (2006.01)
*B60K 35/00* (2006.01)

(52) U.S. Cl.
CPC ...... *B60K 35/00* (2013.01); *B60K 2370/1446* (2019.05); *B60Y 2400/305* (2013.01); *G01H 1/00* (2013.01); *G06F 2203/04105* (2013.01); *G06F 2203/04108* (2013.01)

(58) Field of Classification Search
CPC ...... B60K 2350/1036; B60Y 2400/305; G01H 1/00
See application file for complete search history.

(56) References Cited

U.S. PATENT DOCUMENTS

| | | |
|---|---|---|
| 2013/0176264 A1 | 7/2013 | Alameh |
| 2013/0335370 A1 | 12/2013 | Heo et al. |
| 2014/0333543 A1 | 11/2014 | Yanez et al. |
| 2017/0010653 A1 | 1/2017 | Chang et al. |

FOREIGN PATENT DOCUMENTS

| | | |
|---|---|---|
| DE | 102011114031 A1 | 3/2013 |
| DE | 102012005084 A1 | 9/2013 |
| DE | 102012005800 A1 | 9/2013 |

OTHER PUBLICATIONS

German Search Report, Applicant: e.solutions GmbH; German Patent Application No. 10 2017 000 441.2, Filed Jan. 19, 2017; dated Sep. 19, 2017,3 pgs.
Applicant: e.solutions GmbH; German Application No. 102017 000 441.2; German Office Action dated Dec. 28, 2022; 7 pgs.

* cited by examiner

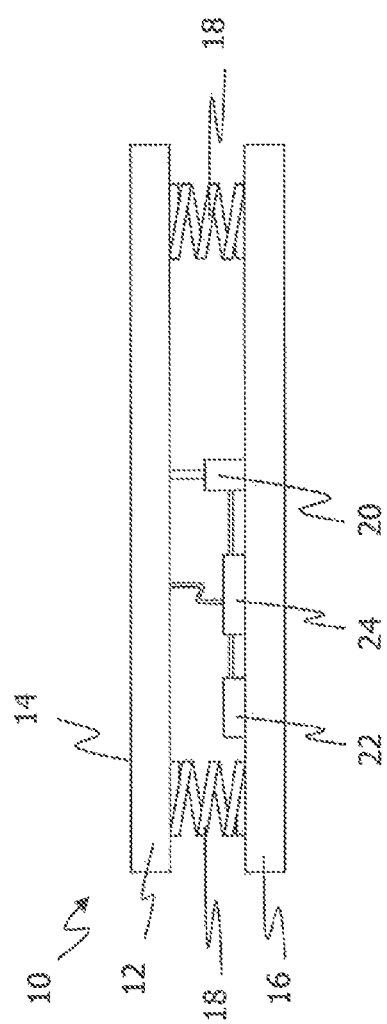

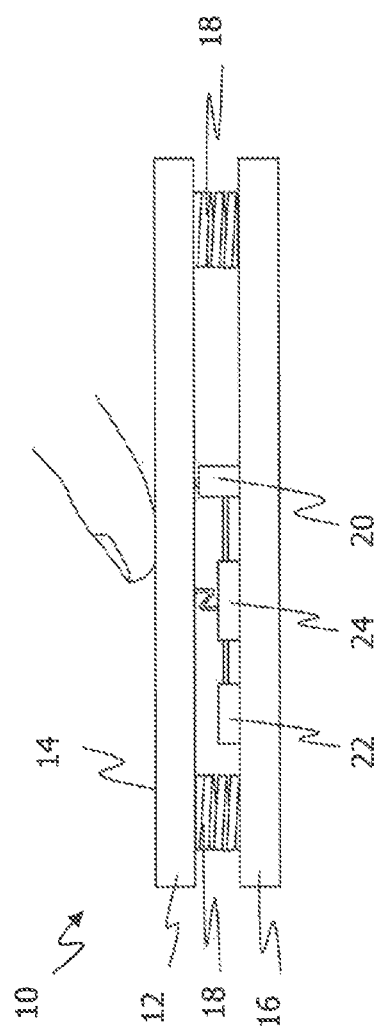

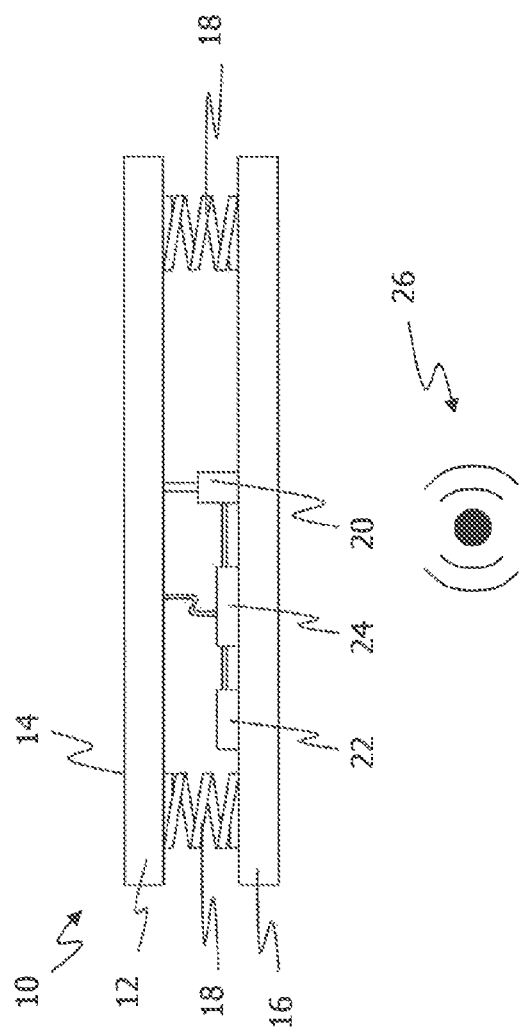

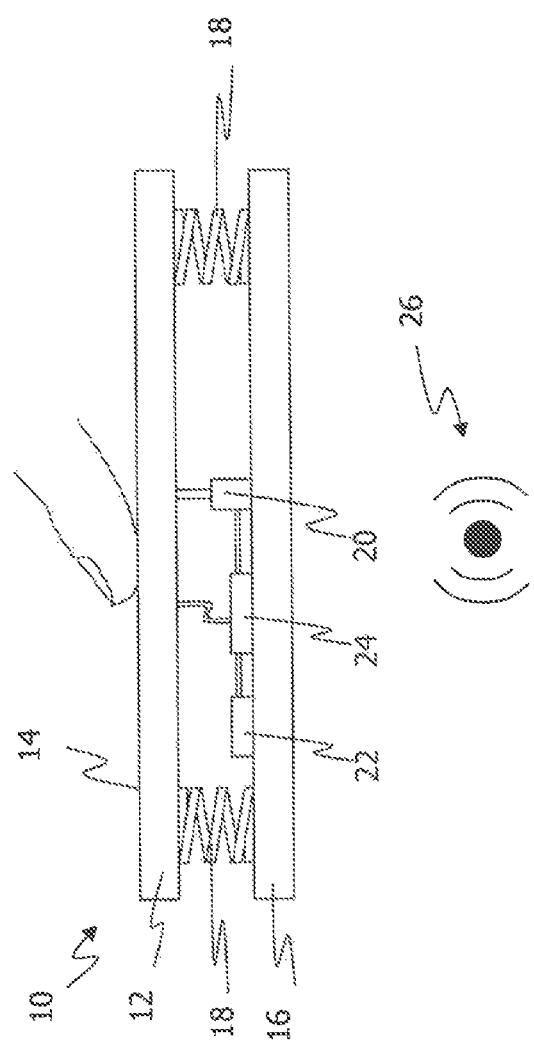

INPUT DEVICE AND METHOD OF DETECTING AN INPUT

CROSS-REFERENCE TO RELATED APPLICATIONS

This application is a continuation of U.S. Continuation patent application Ser. No. 16/719,188, filed Dec. 18, 2019 and entitled "INPUT DEVICE AND METHOD OF DETECTING AN INPUT,' which claims the benefit of U.S. patent application Ser. No. 15/873,054, filed Jan. 17, 2018 and entitled "INPUT DEVICE AND METHOD OF DETECTING AN INPUT," which claims priority under 35 U.S.C. § 119 from German Patent Application No. 10 2017 000 441.2, filed 19 Jan. 2017, and entitled INPUT DEVICE AND METHOD OF DETECTING AN INPUT, each of which is incorporated herein by reference in its entirety.

TECHNICAL FIELD

The present disclosure relates generally to the field of input devices for executing user inputs. Specifically, there is proposed an input device which comprises a vibration sensor for validating inputs. A corresponding validation method is further provided.

BACKGROUND

Input devices are used in many technical systems, such as, for example, in screens, mobile telephones, motor vehicles and tablet computers, etc.

Touch-sensitive surfaces are increasingly being used in input devices. Such surfaces are to be operated intuitively and, in combination with a display unit, can give a user optical feedback when touched. An input device can further comprise a force sensor which detects the application of a force to the touch-sensitive surface. For example, a user can move a mouse pointer onto a switch symbol by means of the touch-sensitive surface and trigger operation of the switch symbol by applying an increased force to the touch-sensitive surface.

Input devices of the above-mentioned type are also used inter alia in mobile or machine-oriented areas in which they are exposed to vibrations. Such areas include, for example, mobile telephones, sports electronics, vehicles or industrial machines. Any vibrations which occur here can lead to unintentional operation of the input device. The reason for this is, for example, acceleration of the input device or of a user due to acceleration, so that the user unintentionally touches the touch-sensitive surface or exerts increased force thereon. The input device can misinterpret this as inputs.

Erroneous inputs can lead to loss of time, miscommunication and accidents. When operating motor vehicles and other machines in particular, corresponding safety considerations play a major role.

Publication US 2009/0243817 A1 discloses an input device which is able to detect touches and force applications by means of a matrix of capacitive sensors. The input device is equipped with an acceleration sensor in order to disregard force applications when vibrations are detected by the acceleration sensor. However, because both the force application and the touch are detected by the same sensor system, the input device is not able to distinguish reliably between a user-generated vibration and an external vibration. An excessively forceful input by a user could be misinterpreted as external vibration and wrongly discarded.

SUMMARY

The object underlying the present disclosure is to provide an input device which permits improved validation of an input.

According to a first aspect there is provided an input device which comprises a touch-sensitive surface, a vibration sensor and a force sensor, wherein the force sensor is adapted to detect a force applied on the touch-sensitive surface. The input device further comprises a control unit which is coupled with the force sensor, the touch-sensitive surface and the vibration sensor, wherein the control unit is adapted to validate a force detected by the force sensor as an input in dependence on a touch of the touch-sensitive surface and in dependence on a vibration detected by the vibration sensor.

The touch-sensitive surface can detect a touch, for example, optically, acoustically, resistively or capacitively. The touch-sensitive surface can output the touch to the control unit in the form of a touch signal. The control unit can detect a touch as an indication of an input only after a minimum area is touched. The minimum area can be chosen depending on signals of the force and/or vibration sensors.

The force sensor can measure a force application, for example, on the basis of an elastic deformation, a distance change or by means of piezoceramic elements or resistive sensors. The force sensor can output the force application to the control unit in the form of a force signal. The control unit can detect an applied force as an indication of an input when the applied force exceeds a force threshold. The force threshold can be chosen depending on signals of the touch-sensitive surface and/or of the vibration sensor. The force sensor can be adapted to detect a force application substantially perpendicular to the touch-sensitive surface. The control unit can be adapted to detect, process or store (e.g. by activating and/or reading the force sensor) a force signal only after a time of a detected touch of the touch-sensitive surface.

The vibration sensor can comprise an acceleration sensor. The vibration sensor can output the vibration to the control unit in the form of a vibration signal. The control unit can detect a vibration as such when it exceeds a vibration threshold value. The vibration threshold value can be chosen depending on signals of the touch-sensitive surface and/or of the force sensor. The vibration sensor can be adapted to detect a direction of the vibration. The control unit can be adapted to detect, process or store (e.g. by activating and/or reading the vibration sensor) a vibration signal only after a time of a detected touch.

The vibration sensor can be arranged on the touch-sensitive surface, on a casing of the input device, or on an element that is rigidly connected to the casing. The vibration sensor can detect a vibration in a direction substantially perpendicular to the touch-sensitive surface. Alternatively, the vibration sensor can detect a vibration in any spatial direction.

The control unit can be adapted to evaluate a force detected by the force sensor as an input in the case where there is a simultaneous a touch of the touch-sensitive surface and where a vibration that correlates temporally with the force detection is absent. In addition or alternatively, the control unit can be adapted to discard a force detected by the force sensor as an input in the case where there is a simultaneous touch of the touch-sensitive surface and where there is a vibration that correlates temporally with the force detection.

The control unit can be adapted to evaluate a temporary interruption of a force detected by the force sensor as an indication of a termination or interruption of the input (and optionally as a new input) in the absence of a vibration that correlates temporally with the interruption. The control unit can be adapted to discard a temporary interruption of a force detected by the force sensor as an indication of a termination or interruption of the input in the case where there is a vibration that correlates temporally with the interruption.

The control unit can be adapted to determine from the detected vibration and the detected force a component of the detected force that is intended by a user and to evaluate the intended force component as an input.

The control unit can be adapted to determine from the detected vibration and the detected force a component of the detected force that is intended by a user and to discard the detected force as an input when the force component of the detected force that is intended by a user is undeterminable. Validation according to claim 1 can include evaluation as an input and/or discarding as an input in this sense.

The control unit can be adapted to determine the intended component of the detected force by reducing the detected force by a vibration-dependent value. The control unit can be adapted to include time derivatives and/or integrals of the detected force and/or of the vibration when determining the intended component of the detected force.

The control unit can be adapted to take into account in the validation durations of the force application and of the vibration. In addition or alternatively, the control unit can be adapted to take into account in the validation a temporal sequence of the detection of the force application and of the vibration. The control unit can specify a time criterion for a temporal correlation between a vibration and a force application. The time criterion can include a time threshold value for a time difference between durations of the force application and of the vibration. The time criterion can include a maximum and/or minimum value for a ratio between the durations of the force application and of the vibration. The control unit can have a temporal sequence criterion for a correlation between a vibration and a force application. The sequence criterion can include a maximum time offset between detection of the vibration and of the force application. The sequence criterion can include detection of the vibration temporally before detection of the force application.

According to a second aspect there is provided an input device which comprises a touch-sensitive surface. The input device further comprises a vibration sensor and a proximity sensor, wherein the proximity sensor is adapted to detect an approach of an input element to the touch-sensitive surface. The input device further comprises a control unit which is coupled with the touch-sensitive surface, the proximity sensor and the vibration sensor, wherein the control unit is adapted to validate a touch detected by the touch-sensitive surface as an input in dependence on an approach detected by the proximity sensor and a vibration detected by the vibration sensor.

The proximity sensor can detect an approach, for example, inductively, capacitively, magnetically or optically. The control unit can evaluate an approach as such when a distance between the touch-sensitive surface and an input element falls below a threshold value. The control unit can be adapted to detect, process or store (e.g. by activating and/or reading the touch-sensitive surface) a touch signal only after a time of a detected approach.

The control unit can be adapted to evaluate a touch detected by the touch-sensitive surface as an input in the case where an approach is simultaneously detected by the proximity sensor and where a vibration that correlates temporally with the detected touch is absent. In addition or alternatively, the control unit can be adapted to discard a touch detected by the touch-sensitive surface as an input in the case where an approach is simultaneously detected by the proximity sensor and where there is a vibration that correlates temporally with the touch detection.

The control unit can be adapted to evaluate a temporary interruption of a touch detected by the touch-sensitive surface as an indication of a termination or interruption of the input (and optionally as a new input) in the absence of a vibration that correlates temporally with the interruption. The control unit can be adapted to discard a temporary interruption of a touch detected by the touch-sensitive surface as an indication of a termination or interruption of the input in the case where there is a vibration that correlates temporally with the interruption.

The control unit can be adapted to take into account in the validation durations of the touch and of the vibration. In addition or alternatively, the control unit can be adapted to take into account in the validation a temporal sequence of the detection of the touch and of the vibration. The control unit can specify a time criterion for a temporal correlation between a vibration and a touch. The time criterion can include a time threshold value for a time difference between durations of the touch and of the vibration. The time criterion can include a maximum and/or minimum value for a ratio between the durations of the touch and of the vibration. The control unit can have a temporal sequence criterion for a correlation between the vibration and the touch. The sequence criterion can include a maximum time offset between detection of the touch and of the vibration. The sequence criterion can include detection of the vibration temporally before detection of the touch.

The input device can further comprise a display unit. The touch-sensitive surface can be adapted to detect a touch in the region of the display unit. The display unit can be based, for example, on liquid crystal, plasma, light-emitting diode or organic light-emitting diode technology. The display unit can be arranged spaced apart from the touch-sensitive surface. Alternatively, the display unit can be formed with the touch-sensitive surface as a single unit.

According to a third aspect there is provided a motor vehicle, wherein the motor vehicle comprises the input device proposed herein. The input device can control, for example, a radio, an on-board computer, a navigation system or an infotainment system of the motor vehicle.

According to fourth aspect there is provided a method of detecting an input at an input device. The input device has a touch-sensitive surface, a vibration sensor and a force sensor, wherein the force sensor is adapted to detect a force applied to the touch-sensitive surface. The method comprises validating a force detected by the force sensor as an input in dependence on a touch of the touch-sensitive surface and in dependence on a vibration detected by the vibration sensor.

A force detected by the force sensor can be evaluated as an input in the case where there is a simultaneous touch of the touch-sensitive surface and where a vibration that correlates temporally with the force detection is absent.

According to a fifth aspect there is provided a method of detecting an input at an input device. The input device has a touch-sensitive surface, a vibration sensor and a proximity sensor, wherein the proximity sensor is adapted to detect an approach of an input element to the touch-sensitive surface. The method comprises validating a touch detected by the touch-sensitive surface as an input in dependence on an approach detected by the proximity sensor and a vibration detected by the vibration sensor.

A touch detected by the touch-sensitive surface can be evaluated as an input in the case where an approach is simultaneously detected by the proximity sensor and where a vibration that correlates temporally with the touch detection is absent.

According to a sixth aspect there is provided a computer program product which is stored on a computer-readable medium, wherein the computer program product comprises instructions which, when carried out on a processor, cause a method as presented herein to be performed.

BRIEF DESCRIPTION OF THE DRAWINGS

Further advantages, details and features of the present disclosure will become apparent from the following description of exemplary embodiments and from the figures, in which:

FIG. 1 is a sectional view of a first exemplary embodiment of an input device;

FIG. 2a is a sectional view of the first exemplary embodiment during an operation without external vibration;

FIG. 2b is a sectional view of the first exemplary embodiment without operation and with external vibration;

FIG. 2c is a sectional view of the first exemplary embodiment during an operation and with external vibration;

DETAILED DESCRIPTION

Figure 3:
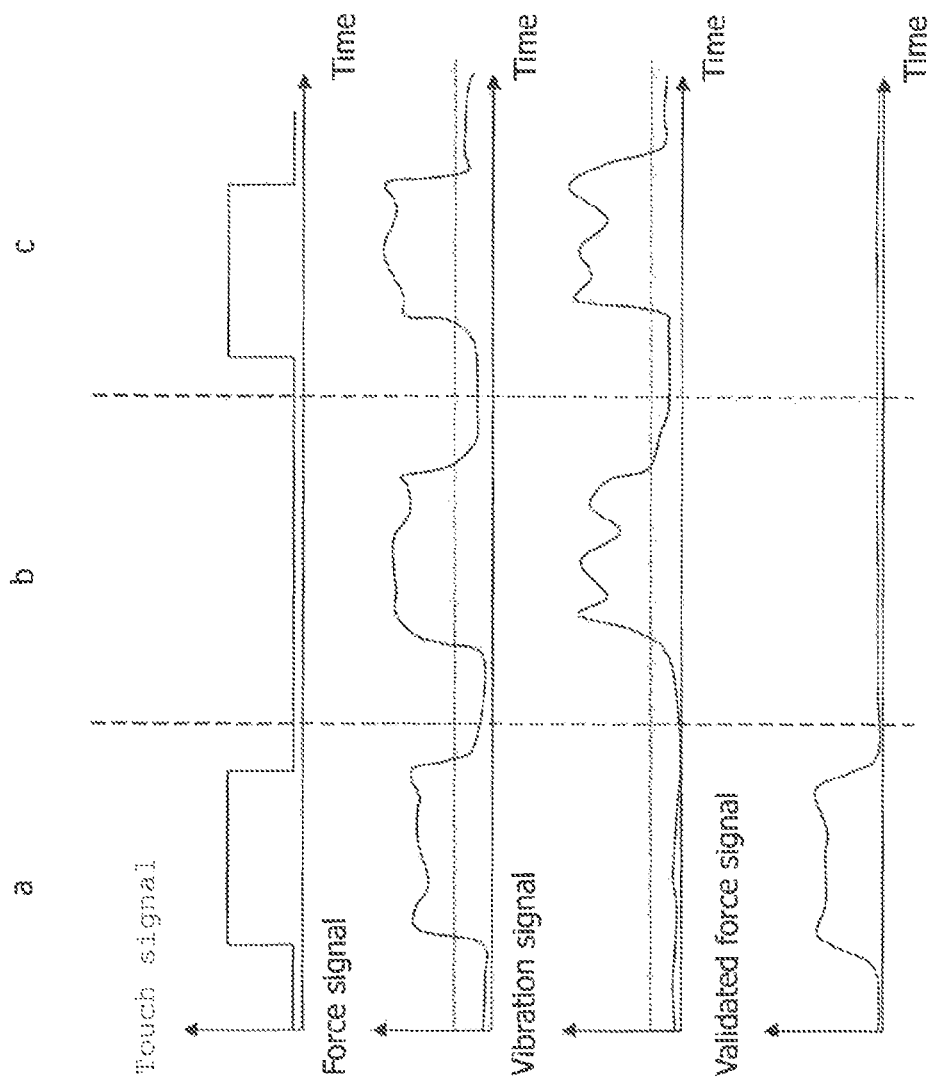
FIG. 3 is schematic diagrams of sensor signals of the sensors from FIGS. 2a-2c.

FIG. 1 shows a sectional view of a first exemplary embodiment of an input device 10. The input device 10 can be installed in a fixed manner in a motor vehicle or in a mobile device, for example a tablet computer or a smart phone.

The input device 10 comprises a functional unit 12 having a touch-sensitive surface 14, wherein the touch-sensitive surface 14 is arranged on a side of the functional unit 12 facing the user. On a side of the functional unit 12 facing away from the touch-sensitive surface 14 there is provided, spaced apart therefrom, a display unit 16. The touch-sensitive surface 14 is permeable to light, so that the display unit 16 is visible to a user through the touch-sensitive surface. The sides of the functional unit 12 and of the display unit 16 that face one another extend substantially parallel to one another.

In an alternative form, the display unit is formed with the touch-sensitive surface 14 as a single unit. This single unit thus forms at least part of the functional unit 12 according to FIG. 1. In this case, the counter-element required for the functional unit 12 for force detection is not the display unit 16 according to FIG. 1 but another rigid element, such as, for example, a printed circuit board or part of a casing.

Between the functional unit 12 and the display unit 16 there are provided elastic elements 18 which are mechanically connected to the functional unit 12 and to the display unit 16. When a force is applied to the touch-sensitive surface 14 in a direction substantially perpendicular to the touch-sensitive surface 14, the elastic elements 18 are deformed, with the result that the distance between the functional unit 12 and the display unit 16 changes.

Between the functional unit 12 and the display unit 16 there is further provided a force sensor 20. The force sensor 20 can determine a force applied on the touch-sensitive surface 14, for example, from a detected change in the distance between the functional unit 12 and the display unit 16 and a known deformation resistance of the elastic elements 18. However, for the input device 10 it is not necessary that a force application leads to a significant distance change. Alternatively, the force sensor 20 can also measure a force by means of piezoceramic elements or resistive sensors. Furthermore, the force sensor 20 can also be arranged between the functional unit 12 and another component, such as, for example, a casing (not shown). If the elastic elements 18 were omitted, the force sensor 20 could also be arranged on a side of the display unit 16 opposite the functional unit 12.

The input device 10 has a vibration sensor 22. The vibration sensor can be, for example, an acceleration sensor. In the exemplary embodiment, the vibration sensor 22 is arranged on a side of the display unit 16 that faces the functional unit 12. The display unit 16 is, in turn, rigidly connected to a casing (not shown), so that an external vibration acting on the casing is transmitted by the rigid connection via the display unit 16 to the vibration sensor 22. Of course, the vibration sensor 22 could also be arranged directly on the casing or at another location (but rigidly with respect to the display unit 16). The vibration sensor 22 can also be arranged on the functional unit 12 or another element that is rigidly coupled with the input device 10. For space-saving reasons, the vibration sensor 22 can also be arranged in a recess in a component such as the functional unit 12, the display unit 16, the force sensor 20 or a casing.

The input device 10 has a control unit 24 which is electrically coupled with the force sensor 20, the vibration sensor 22 and the touch-sensitive surface 14. The control unit 24 can be arranged, for example, on the display unit 16, the functional unit 14 or a casing of the input device 10 (not shown). The control unit 24 can also be implemented by another computing unit such as, for example, a mobile telephone processor or the control device of a vehicle.

The elastic element 18, the force sensor 20, the vibration sensor 22 and the control unit 24 are so arranged in such a way relative to the display unit 16 that a view of a display surface of the display unit 16 is not impaired by these components.

The control unit 24 is adapted to receive a force signal from the force sensor 20. The force signal can be an absolute measurement (e.g. in newtons [N]) or can be given in arbitrary units. The force signal can also include a time indication or permit allocation to a time indication by the control unit 24.

The control unit 24 is further adapted to receive a touch signal from the touch-sensitive surface 14. The touch-signal is indicative of whether the touch-sensitive surface 14 is being touched. The touch signal can further provide information about a size and/or number of touch surfaces. Thus, for example, a large number of touches over a short period of time can be interpreted as a further indication of unintentional touching of the touch-sensitive surface 14 with more than one finger. A touch threshold value for the touch surface can also be introduced. The touch threshold value can be dependent on the measured force signal and/or vibration signal. The touch signal can also include a time indication or permit allocation to a time indication by the control unit 24.

The control unit 24 is further adapted to receive a vibration signal from the vibration sensor 22. The vibration signal is at least indicative of a vibration in a direction substantially perpendicular to the touch-sensitive surface 14. Compared with other directions, vibrations in this direction have a higher probability of accelerating the functional unit 12 or the user in such a manner that the input device 10 is unintentionally operated and the control unit 24 erroneously detects an input. Furthermore, the vibration signal can also be indicative of the directions in which the vibrations act. Information about a direction of a vibration has the advantage that it is possible to consider the extent to which a vibration must be taken into account in the validation of the input. A vibration that is oriented parallel to the touch-sensitive surface 20 has a lower probability of effecting unintentional operation than a vibration that is oriented perpendicularly to the touch-sensitive surface 20. The vibration signal can also include a time indication or permit allocation to a time indication by the control unit 24.

The control unit 24 can receive and process the received signals continuously or at periodic time intervals. The control unit 24 can also be adapted to initiate the receiving or processing of specific signals when a requirement is fulfilled. The sensors can likewise be adapted to generate or send the signals when a requirement is fulfilled. Thus, for example, activation and/or reading of the corresponding sensors for the force signals and/or vibration signals can take place only after a touch has been registered.

FIG. 2a-2c show sectional views of the first exemplary embodiment under different touch and vibration conditions. FIG. 3 shows, schematically, the associated curves of the detected touch, force and vibration signals over time, wherein columns a-c in FIG. 3 correspond to the cases from FIG. 2a-2c. The horizontal lines in the force signal and vibration signal diagram in each case indicate a threshold value for detection of an event that is present (that is to say force application and vibration). The diagram in the fourth line shows in which of the cases a detected force is evaluated as an input after evaluation of the other signals by the control unit 24.

FIG. 2a shows a sectional view of the first exemplary embodiment during an operation without external vibration. A user touches the touch-sensitive surface 14 and exerts a force thereon. Accordingly, a touch signal is measured by the touch-sensitive surface 14 and a force signal is measured by the force sensor 20. Since no vibration is present, no significant vibration signal above the corresponding threshold value is measured.

The presence of a touch initiates validation of the force signal by the control unit 24. By correlating the force signal with the other signals it is hereby determined whether the force application is an intentional input. The presence of a touch indicates that the user is at least operating the input device 10 and that the force application cannot merely be the result of a vibration. Since no vibration signal above a threshold value is detected, it is to be expected that the force application is intended by the user. The force application is thus evaluated as an input by the control unit 24, taking into account the touch signal and the vibration signal. The input signal can be transmitted further for controlling a function, for example.

FIG. 2b shows a sectional view of the first exemplary embodiment without operation and with external vibration 26. In FIG. 3, column b, it will be seen that the force sensor 20 detects a force. However, the touch-sensitive surface 14 does not detect a touch. It can be concluded therefrom that the user is at present not operating the input device 10. It is to be supposed that an erroneous input has been effected by a vibration. The validation process can then immediately be terminated by the control unit 24 and the force signal can be discarded. This has the advantage that consumption of processor power and energy is reduced. Alternatively, the vibration signal can additionally be taken into account, which actually shows that a vibration 26 is present. An advantage of additionally taking account of the vibration signal is improved validation of the force signal on the basis of two independent sensors.

FIG. 2c shows a sectional view of the first exemplary embodiment during an operation and with external vibration 26. In FIG. 3, column c, it will again be seen that the touch-sensitive surface 14 detects a touch. In addition, the force sensor 20 detects a force application. It is not yet apparent from these two pieces of information whether the input is intentional or whether the user is exerting an unintentional force application on the touch-sensitive surface 14 due to the vibration. If the vibration signal is additionally taken into account, it will be seen that a vibration 26 is present. The force signal is therefore not evaluated by the control unit 24 as an input but is discarded.

Figure 4:
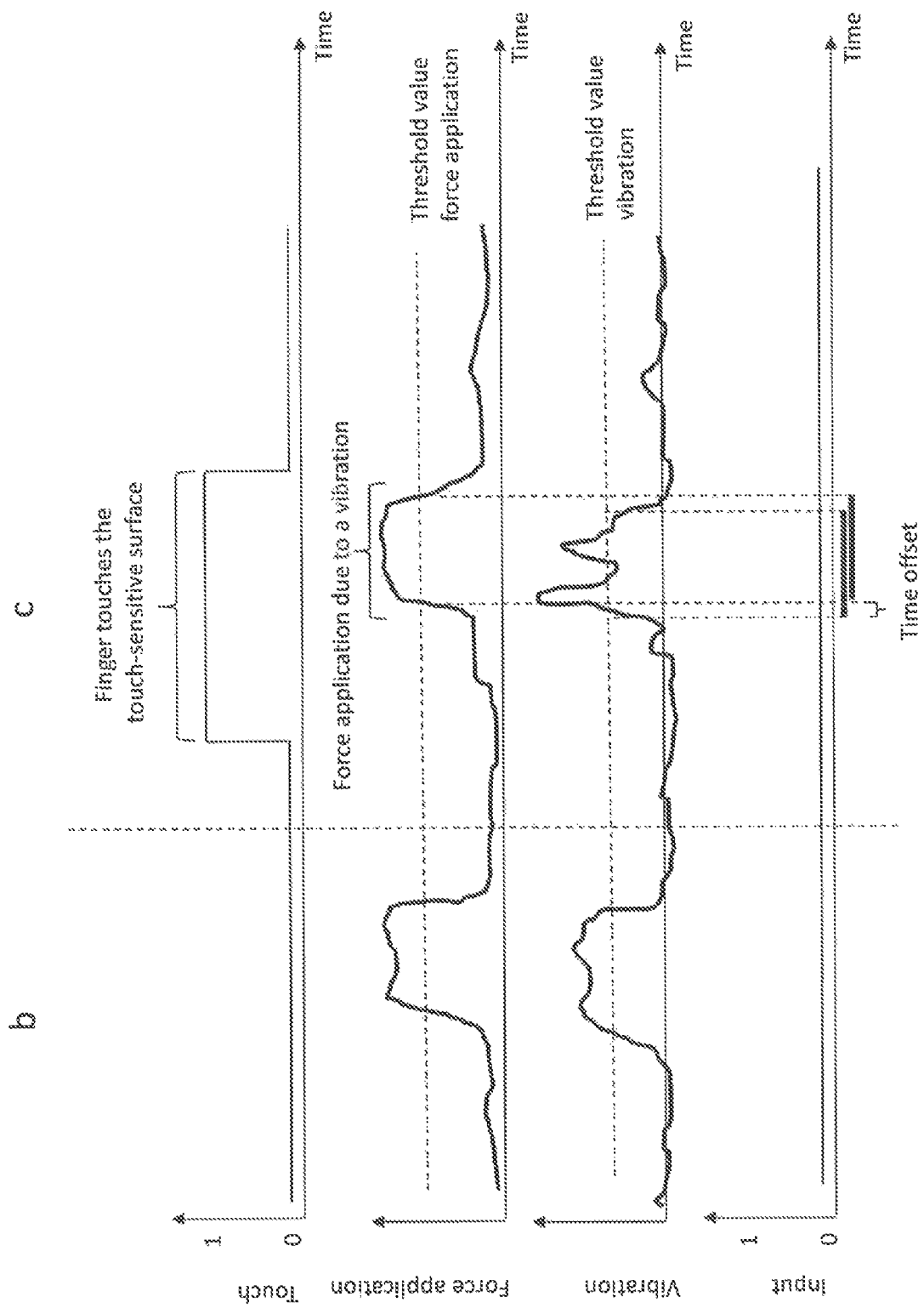
FIG. 4 is schematic diagrams of sensor signals with a time offset between the detected force and the detected vibration.

FIG. 4 shows schematic diagrams of sensor signals with a time offset between the detected force and the detected vibration. In the diagrams, the two cases b and c are again shown by way of example. Furthermore, in the case of c, durations of the force application and of the vibration and a temporal sequence of the detection of the force application and of the vibration are taken into account. In case c, a touch, a force application and a vibration are detected. The duration of the force application corresponds substantially to the duration of the vibration. If, on the other hand, the duration of the force application was, for example, ten times the duration of the vibration, a lesser causal relationship between the vibration and the force application is to be expected. However, because durations of substantially equal length are detected in the present case, it is to be expected that the force application is a result of the vibration.

A time offset is additionally to be observed between the vibration and the force application, whereby the vibration is detected before the force application. Information for a possible correlation between the vibration and the force application can be derived both from the time offset and from the temporal sequence. The reason for a time offset can be, for example, damping by the resilient element 18. A vibration which moves the display unit 16 is detected by the vibration sensor 22. The movement of the display unit 16 is initially compensated for by elastic deformation of the elastic element 18. The vibration is transmitted to the functional unit 20 with a time offset and therefore detected late at the force sensor 20. A small time offset suggests a causal relationship between the vibration and the force application. In the case of a large time offset, on the other hand, it is to be expected that the force application and the vibration have two different causes.

The temporal sequence of the detection can further be evaluated. If a vibration is detected temporally before or at the same time as the force application, this suggests a causal relationship between the vibration and the force application. If, on the other hand, a force application is detected before the vibration, it is to be expected that the force application is not caused by the vibration.

The temporal causal evaluations discussed above can be carried out by the control unit 24 for the (optionally additional) validation of an indication of an input. Depending on the evaluation, the input can be evaluated or discarded.

Figure 5:
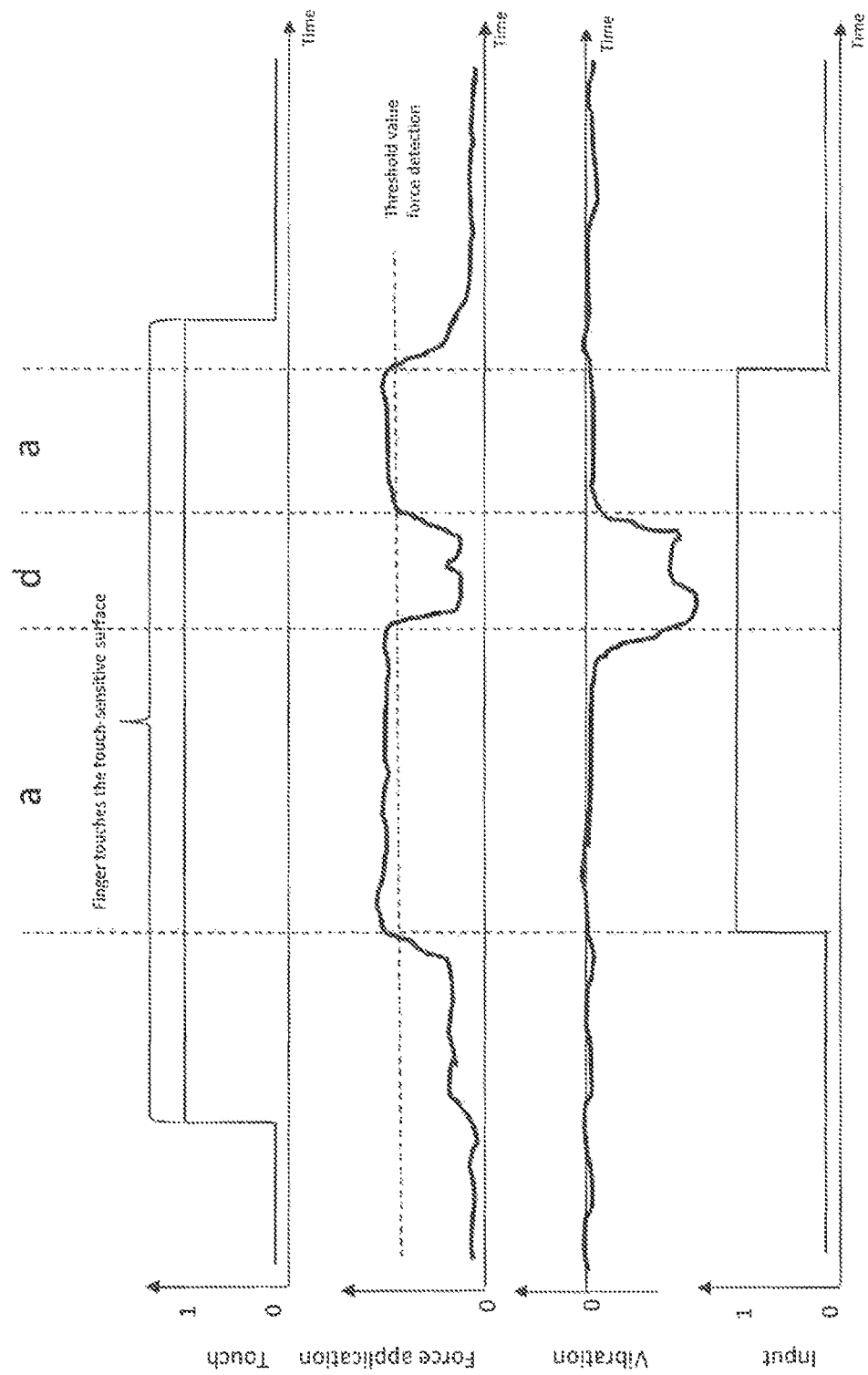
FIG. 5 is schematic diagrams of sensor signals during an interruption of a detected force due to a vibration with a time offset between the detected force and the detected vibration.

FIG. 5 shows schematic diagrams of sensor signals during an interruption of a detected force due to a vibration. This is a temporally continuing operation of the input device 10. If a user wishes to operate a window lift or to play a music recording, for example, the user must execute an input for the period of time for which this action is to be carried out. For the input, a force application above a specific threshold must act on the touch-sensitive surface 14 for that period of time and be detected by the force sensor 20. A vibration can act against this intentionally long-lasting force application and interrupt it. This interruption is hereafter checked for plausibility by the control unit 24.

At least the beginning of the input corresponds to case a according to FIG. 3, that is to say a touch, a force application and no significant vibration are measured. The force application is thus evaluated as an input. In region d, an interruption of the force application and a vibration are then detected. The touch-sensitive surface 14 continues to detect a touch. Since the vibration correlates temporally with the interruption of the force application, the interruption of the force application is discarded. The operation therefore continues to be evaluated as an input (e.g. of the window lifter or for playing). As soon as the vibration decreases again, case a is established again. A touch, a force application and no significant vibration are thus detected. The force application continues to be detected as an input. By taking account of the vibration, an input has been executed over the entire input time even though a vibration led to an unintentional interruption of the force application. This resulted in improved, more reliable and thus also more pleasant operation.

Figure 6:
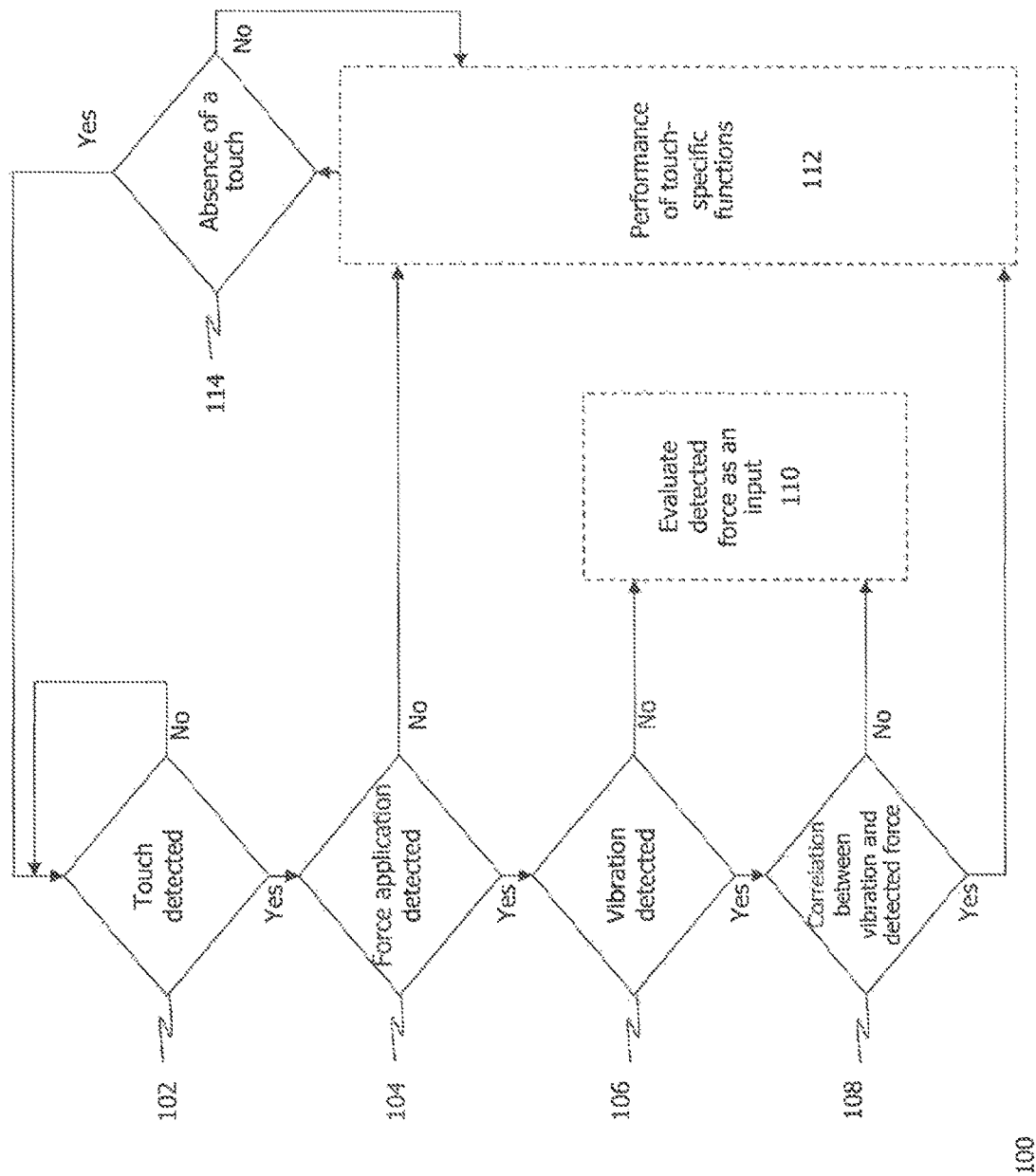
FIG. 6 is a flow diagram of a first exemplary embodiment of a method of detecting an input.

FIG. 6 shows a flow diagram of a first exemplary embodiment of a method 100 of detecting an input.

In step 102, it is checked whether a touch of the touch-sensitive surface 16 is detected. As soon as a touch is detected, it is checked in step 104 whether a force application is detected. If no force application is detected, only a touch-specific function 112, such as, for example, a movement of a mouse pointer, is performed. This function is performed until absence 114 of the touch is detected.

If, on the other hand, a touch and a force application are detected, it is further checked in step 106 whether a vibration is detected. If the absence of a vibration is detected, the detected force is evaluated as an input in step 110. If, on the other hand, a vibration is detected which correlates, as explained above, with the force application, the input is discarded and only the touch-specific function 112 is performed.

Steps 110 and 112 are bordered by a broken line in the flow diagram. This identifies steps which in alternative forms may also comprise further or different functions.

Figure 7:
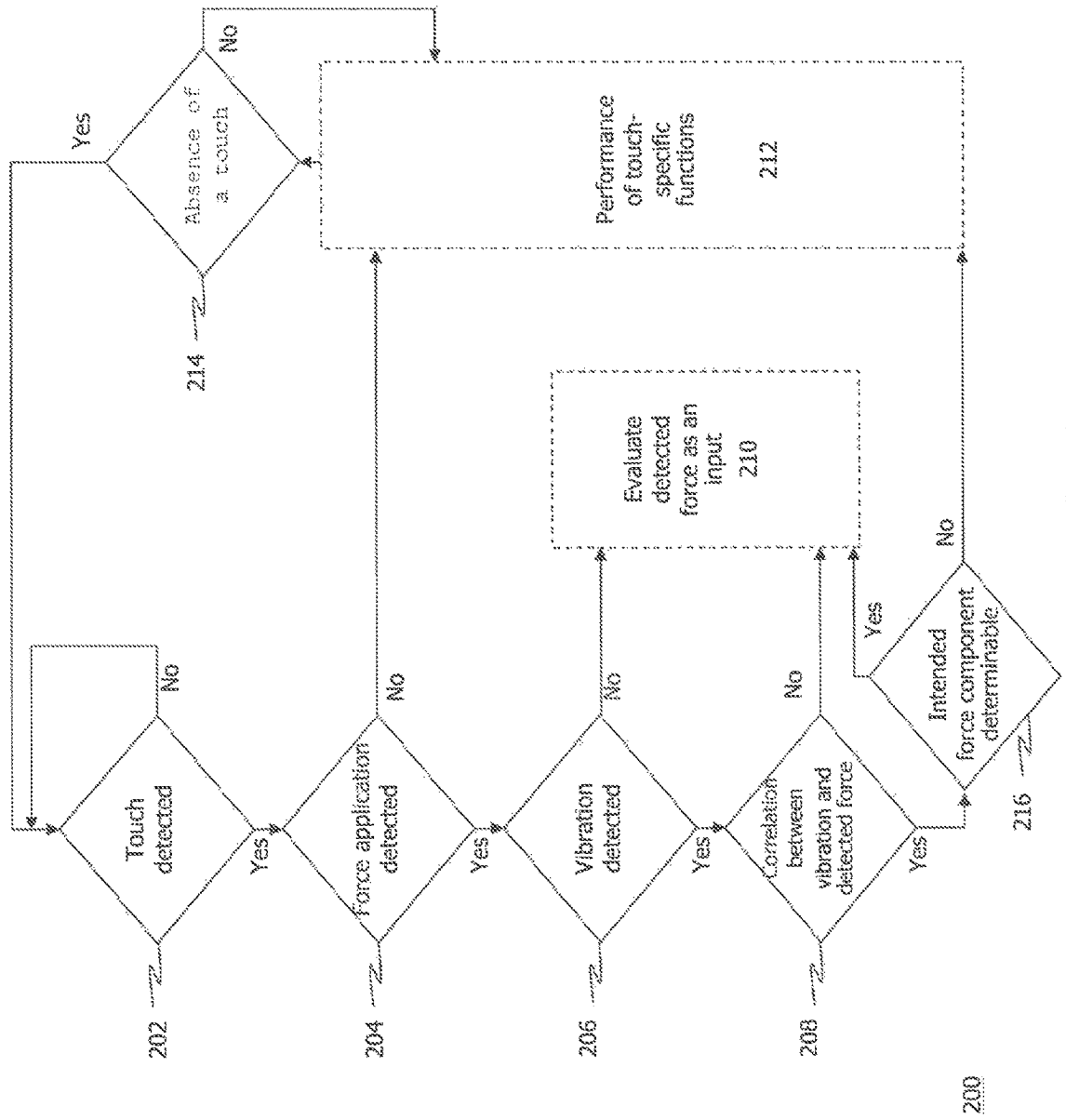
FIG. 7 is a flow diagram of a second exemplary embodiment of a method of detecting an input.

FIG. 7 shows a flow diagram of a second exemplary embodiment of a method of detecting an input. The second exemplary embodiment of the method differs from the first exemplary embodiment (see FIG. 6) substantially by step 216.

First of all, in steps 202 to 208—as explained above for the corresponding steps 102 to 108—a touch, a force application and a vibration are detected and a correlation between the vibration and the detected force is confirmed. In step 216, a component of the detected force that is intended by a user is then determined from the detected vibration and the detected force. The intended force component can be determined, for example, by reducing the detected force by a vibration-dependent value. The vibration-dependent value can be derived from a scaled vibration signal. Alternatively or in addition, the force signal can be newly scaled for the determination. If the intended force component can be determined, this intended force component is evaluated as an input.

If the intended force component cannot be determined, the detected force is discarded as an input. The intended force component can be considered undeterminable, for example, when a difference between a force signal and the scaled vibration signal is below a threshold value.

Steps 210 and 212 are again shown bordered by a broken line in the flow diagram. This identifies steps which in alternative forms may also comprise further or different functions.

Determining the intended force component has the advantage, inter alia, that erroneous inputs can not only be disregarded but also corrected. Input reliability and input comfort are thereby improved for a user.

Figure 8:
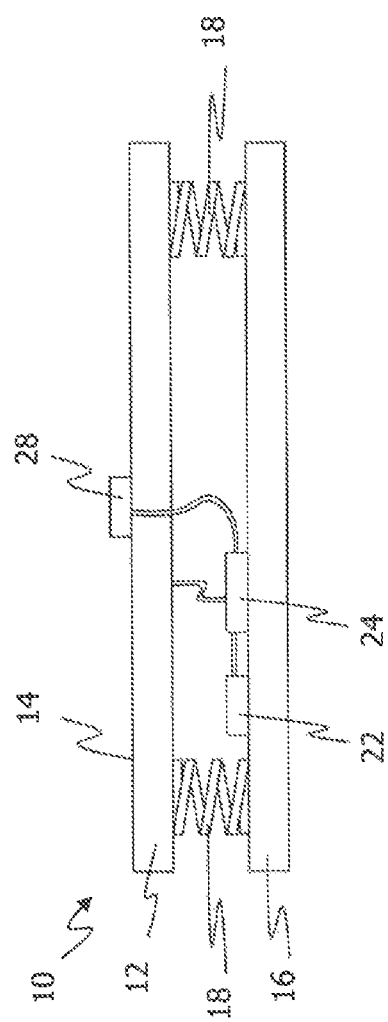
FIG. 8 is a sectional view of a second exemplary embodiment of an input device.

FIG. 8 shows a sectional view of a second exemplary embodiment of an input device 10. The input device 10 according to FIG. 8 differs from that of the first exemplary embodiment substantially in that it has a proximity sensor 28 instead of a force sensor 20 (see FIG. 1), and it can carry out substantially similar validations in respect of the proximity sensor 28 as described above. Of course, an input device 10 can have both the force sensor 20 and the proximity sensor 28. However, for the description of a validation of the touch, the force sensor is only secondary.

The proximity sensor 28 is arranged on the functional unit 12. The proximity sensor 28 can also be arranged on the display unit 16 or a casing. The proximity sensor 28 can detect, for example, a distance between the touch-sensitive surface 14 and an approaching input element (e.g. the finger of a user). A criterion for the detection of an approach can include, for example, that distance falling below a threshold value.

The validation of a detected touch proceeds analogously to the above-described validation of a force application. In both validations, an indication of an input is correlated with a vibration and with a second detected signal. In the case of the validation of a force application, the indication of the input is a detected force and the second detected signal is a detected touch. In the case of the validation of a touch, on the other hand, the indication of the input is a detected touch and the second detected signal is a detected approach.

Accordingly, if a touch is detected by the touch-sensitive surface 14, it is checked whether an approach and a vibration that correlates with the touch have been detected. If a vibration or the absence of an approach is detected, the detected touch is discarded. If, however, an approach and the absence of a vibration is detected, the touch is evaluated as an input.

Figure 9:
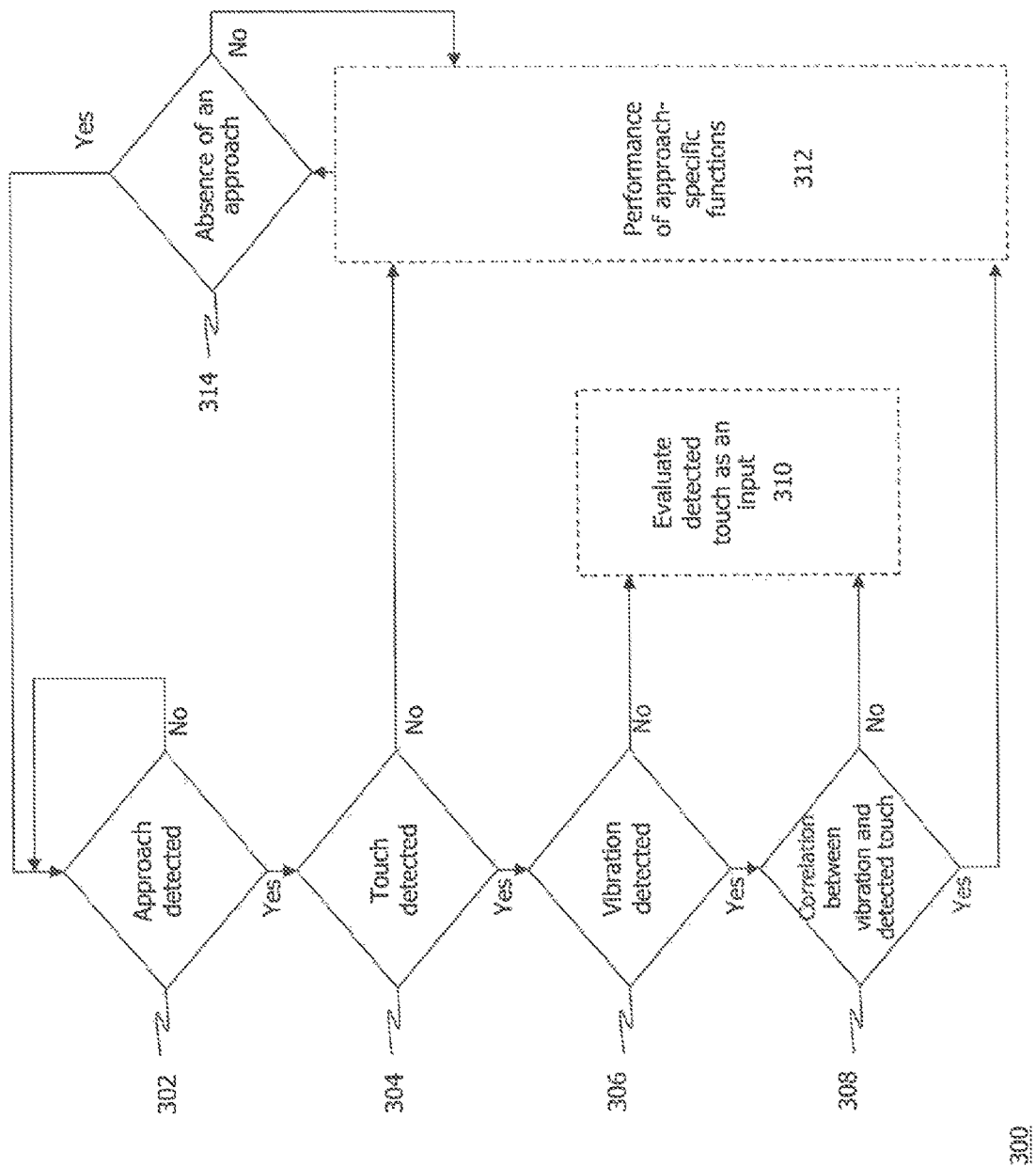
FIG. 9 is a flow diagram of a third exemplary embodiment of a method of detecting an input.

FIG. 9 shows a flow diagram of a third exemplary embodiment of a method of detecting an input 300 on the basis of the input device according to FIG. 8. In step 302, it is checked whether an approach to the touch-sensitive surface 16 is detected. As soon as an approach is detected, it is checked in step 304 whether a touch of the touch-sensitive surface 14 is detected. If no touch is detected, merely an approach-specific function 312, such as, for example, activation of display illumination, is performed. This function is performed until the absence 314 of the approach is detected.

If, on the other hand, an approach and a touch are detected, it is further checked in step 306 whether a vibration is detected. If the absence of a vibration is detected, the detected touch is evaluated as an input in step 310. If, on the other hand, a vibration is detected which correlates with the touch, the input is discarded and only the approach-specific function 312 is performed.

Steps 310 and 312 are again bordered by a broken line in the flow diagram. This identifies steps which in alternative forms may also comprise further or different functions.

In the examples presented, different features and functions of the present disclosure have been described separately from one another and in specific combinations. It will be appreciated, however, that many of these features and functions can be freely combined with one another, where this is not explicitly excluded.

The invention claimed is:

1. An input device comprising
a touch-sensitive surface;
a proximity sensor which is adapted to detect an approach of an input element to the touch-sensitive surface;
a vibration sensor;
a control unit which is coupled with the touch-sensitive surface, the proximity sensor and the vibration sensor, wherein the control unit is adapted to validate a touch detected by the touch-sensitive surface as an input in dependence on an approach detected by the proximity sensor and a vibration detected by the vibration sensor;
wherein the control unit is adapted to take into account in the validation a temporal sequence of the detection of the touch and of the vibration, wherein the control unit is adapted to evaluate a touch detected by the touch-sensitive surface as an input in the case that in the temporal sequence the detection of the touch occurs before the detection of the vibration.

2. The input device according to claim 1, wherein the control unit is adapted to evaluate a touch detected by the touch-sensitive surface as an input in the case where an approach is simultaneously detected by the proximity sensor and where a vibration that correlates temporally with the touch detection is absent.

3. The input device according to claim 1, wherein the control unit is adapted to discard a touch detected by the touch-sensitive surface as an input in the case where an approach is simultaneously detected by the proximity sensor and where there is a vibration that correlates temporally with the touch detection.

4. The input device according to claim 1, wherein the control unit is adapted to evaluate a temporary interruption of a touch detected by the touch-sensitive surface as an indication of a termination or interruption of the input in the absence of a vibration that correlates temporally with the interruption.

5. The input device according to claim 1, wherein the control unit is adapted to discard a temporary interruption of a touch detected by the touch-sensitive surface as an indication of a termination or interruption of the input in the case where there is a vibration that correlates temporally with the interruption.

6. The input device according to claim 1, wherein the control unit is adapted to evaluate an approach as such when a distance between the touch-sensitive surface and an input element falls below a threshold value.

7. The input device according to claim 1, wherein the control unit is adapted to detect, process or store a touch signal only after a time of a detected approach.

8. The input device according to claim 1, wherein the vibration sensor is adapted to detect a vibration in a direction substantially perpendicular to the touch-sensitive surface.

9. The input device according to claim 1, further comprising a display unit.

10. The input device according to claim 1, installed in a motor vehicle comprising at least one vehicle-based device selected from a radio, an on-board computer, a navigation system, and an infotainment system; and an input device, wherein the input device is adapted to control the at least one vehicle-based device.

11. The input device according to claim 10, wherein the control unit is implemented by an electronic control unit, ECU, of the motor vehicle.

12. An input device comprising
a touch-sensitive surface;
a proximity sensor which is adapted to detect an approach of an input element to the touch-sensitive surface;
a vibration sensor;
a control unit which is coupled with the touch-sensitive surface, the proximity sensor and the vibration sensor, wherein the control unit is adapted to validate a touch detected by the touch-sensitive surface as an input in dependence on an approach detected by the proximity sensor and a vibration detected by the vibration sensor, wherein the control unit is adapted to take into account in the validation a temporal sequence of the detection of the touch and of the vibration, wherein the control unit is adapted to discard a touch detected by the touch-sensitive surface as an input in the case that in the temporal sequence the detection of the vibration occurs before or at the same time as the detection of the touch.

13. A method of detecting an input at an input device which has a touch-sensitive surface, a proximity sensor for detecting an approach of an input element to the touch-sensitive surface and a vibration sensor, wherein the method comprises:
validating a touch detected by the touch-sensitive surface as an input in dependence on an approach detected by the proximity sensor and a vibration detected by the vibration sensor,
taking into account in the validation a temporal sequence of the detection of the touch and of the vibration,
evaluating a touch detected by the touch-sensitive surface as an input in the case that in the temporal sequence the detection of the touch occurs before the detection of the vibration.

14. A non-transitory computer program product which is stored on a computer-readable medium, wherein the computer program product comprises instructions which, when carried out on a processor, cause a method according to claim 13 to be performed.

15. A method of detecting an input at an input device which has a touch-sensitive surface, a proximity sensor for detecting an approach of an input element to the touch-sensitive surface and a vibration sensor, wherein the method comprises:
validating a touch detected by the touch-sensitive surface as an input in dependence on an approach detected by the proximity sensor and a vibration detected by the vibration sensor,
taking into account in the validation a temporal sequence of the detection of the touch and of the vibration, discarding a touch detected by the touch-sensitive surface as an input in the case that in the temporal sequence the detection of the vibration occurs before or at the same time as the detection of the touch.

* * * * *